(12) United States Patent
Nishida et al.

(10) Patent No.: US 6,898,090 B2
(45) Date of Patent: May 24, 2005

(54) SWITCHING POWER SUPPLY UNIT AND ELECTRONIC APPARATUS USING THE SAME

(75) Inventors: Akio Nishida, Kyoto (JP); Hiroshi Takemura, Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 107 days.

(21) Appl. No.: 10/638,395

(22) Filed: Aug. 12, 2003

(65) Prior Publication Data

US 2004/0037093 A1 Feb. 26, 2004

(30) Foreign Application Priority Data

Aug. 20, 2002 (JP) ........................................ 2002-239708

(51) Int. Cl.[7] .......................................... H02M 3/335
(52) U.S. Cl. ........................................................ 363/19
(58) Field of Search ........................ 363/18, 19, 21.07, 363/21.08, 21.12, 21.15, 21.16, 97; 323/902

(56) References Cited

U.S. PATENT DOCUMENTS

| 4,758,937 A |   | 7/1988 | Usui et al. |
|---|---|---|---|
| 5,012,399 A | * | 4/1991 | Takemura et al. ............. 363/18 |
| 5,995,382 A | * | 11/1999 | Miyazaki et al. .............. 363/19 |
| 6,208,530 B1 | * | 3/2001 | Hosotani ....................... 363/19 |
| 6,529,392 B2 | * | 3/2003 | Nishida et al. ........... 363/21.16 |
| 6,577,511 B2 | * | 6/2003 | Yamaguchi et al. ...... 363/21.07 |

FOREIGN PATENT DOCUMENTS

| EP | 1 020 980 A3 | 7/2000 |
|---|---|---|
| EP | 0 938 184 A3 | 8/2001 |
| EP | 1 150 417 A1 | 10/2001 |
| GB | 2 168 865 A | 6/1986 |
| JP | 07-067335 | 3/1995 |

* cited by examiner

*Primary Examiner*—Gary L. Laxton
(74) *Attorney, Agent, or Firm*—Keating & Bennett, LLP

(57) ABSTRACT

A switching power supply unit includes a transformer including a primary winding, a secondary winding, and a feedback winding; an input power supply and a first switching element that are connected in series with the primary winding; a control circuit provided between one end of the feedback winding and a control terminal of the first switching element; a rectification circuit connected to the secondary winding; and an output voltage detection circuit for detecting output voltage output from the rectification circuit and for sending a feedback signal to the control circuit. The control circuit includes an on-period control circuit for stabilizing the output voltage by turning off the first switching element in an on-state in accordance with the feedback signal. The control circuit also includes an off-period control circuit for stabilizing the output voltage by delaying turning on of the first switching element in accordance with the feedback signal.

12 Claims, 11 Drawing Sheets

SWITCHING POWER SUPPLY UNIT AND ELECTRONIC APPARATUS USING THE SAME

BACKGROUND OF THE INVENTION

1. Field of the Invention

The present invention relates to a switching power supply unit and an electronic apparatus including such a switching power supply unit.

2. Description of the Related Art

There has been an increasing need for reducing power consumption when, for example, printers or facsimiles are in a standby mode, or when such devices are not performing a printing operation. Among various types of needs, a reduction in power consumption is required when power supply units used for printers or facsimiles are in a standby mode, or in a light-load mode.

However, general ringing choke converter (RCC) type switching power supply units have characteristics such that, as a load is reduced, the switching frequency is increased and the switching loss is thus increased. Thus, it is difficult to reduce the power consumption in the light-load mode.

An RCC type switching power supply unit for reducing power consumption in a light-load mode is disclosed, for example, in Japanese Unexamined Patent Application Publication No. 7-67335. The switching power supply unit disclosed in Japanese Unexamined Patent Application Publication No. 7-67335 includes a circuit in which a control terminal of a first switching element is forcibly grounded for a predetermined time in the light-load mode. Thus, turning on of the first switching element is delayed, so that the switching frequency is maintained below a predetermined level. Accordingly, power consumption in the light-load mode is reduced.

However, the switching power supply unit disclosed in Japanese Unexamined Patent Application Publication No. 7-67335 has a problem. Since the switching frequency is merely maintained below the predetermined level, the switching frequency cannot be drastically reduced in the light-load mode. Thus, the power consumption cannot be drastically reduced.

Also, there is another problem in that the switching frequency cannot follow an abrupt load change. For example, if the switching frequency in the light-load mode is set to be significantly different from that in the heavy-load mode, the switching frequency cannot follow an abrupt change from a lighter load to a heavier load. Thus, a reduction in output or suspension of a power supply may be caused. Accordingly, there is a problem in that the switching frequency cannot be drastically reduced in the light-load mode.

SUMMARY OF THE INVENTION

In order to solve the above-described problems, preferred embodiments of the present invention provide a switching power supply unit that is capable of reducing the power consumption by drastically reducing the switching frequency in a light-load mode and an electronic apparatus including such a novel switching power supply unit.

According to a preferred embodiment of the present invention, a switching power supply unit includes a transformer including a primary winding, a secondary winding, and a feedback winding; an input power supply; a first switching element; a control circuit provided between one end of the feedback winding and a control terminal of the first switching element; a rectification circuit connected to the secondary winding; and an output voltage detection circuit for detecting output voltage output from the rectification circuit and for sending a feedback signal to the control circuit. The input power supply and the first switching element are connected in series with the primary winding. The control circuit includes an on-period control circuit for stabilizing the output voltage by turning off the first switching element in an on-state in accordance with the feedback signal. The control circuit also includes an off-period control circuit for stabilizing the output voltage by delaying turning on of the first switching element in accordance with the feedback signal.

Preferably, in a light-load mode, the output voltage is stabilized by operating the off-period control circuit in order to control the off-period. Preferably, in a mode other than the light-load mode, the output voltage is stabilized by operating the on-period control circuit in order to control the on-period.

The feedback signal may include a first feedback signal for controlling the on-period control circuit and a second feedback signal for controlling the off-period control circuit. The output voltage detection circuit may exclusively output the first feedback signal or the second feedback signal in accordance with load power.

The output voltage detection circuit may include a first light-emitting diode for outputting the first feedback signal, a shunt regulator connected in series with the first light-emitting diode, and a first series circuit connected in parallel with the first light-emitting diode. The first series circuit may include a second light-emitting diode and a constant voltage source that is arranged in such a manner that no current flows into the second light-emitting diode until the output voltage exceeds a predetermined value. The on-period control circuit may include a second switching element provided between the control terminal of the first switching element and a ground at an input side and a time constant circuit connected to a control terminal of the second switching element and functioning to turn on the second switching element. The time constant circuit may include a second series circuit including a resistor and a first phototransistor that is coupled to the first light-emitting diode. Preferably, the resistance value of the resistor in the second series circuit is determined in such a manner that current flowing into the first phototransistor is hardly changed even when a current greater than or equal to a predetermined value flows into the first light-emitting diode, thereby the time constant of the time constant circuit does not change and the on-period control circuit does not practically operate in order to stabilize the output voltage.

The output voltage detection circuit may include a first light-emitting diode for outputting the first feedback signal, a switch connected in series with the first light-emitting diode, a shunt regulator connected in series with a series circuit including the first light-emitting diode and the switch, and a first series circuit connected in parallel with the series circuit including the first light-emitting diode and the switch. The first series circuit may include a second light-emitting diode and a constant voltage source that is arranged in such a manner that no current flows into the second light-emitting diode until the output voltage exceeds a predetermined value. The on-period control circuit may include a second switching element provided between the control terminal of the first switching element and a ground at an input side and a time constant circuit connected to a control terminal of the second switching element and functioning to turn on the second switching element. The time constant circuit may include a second series circuit including a resistor and a first phototransistor that is coupled to the first light-emitting diode.

The off-period control circuit may include a third switching element connected in series between the one end of the feedback winding and the control terminal of the first switching element. Preferably, the third switching element is switched in accordance with the second feedback signal sent from the output voltage detection circuit.

The off-period control circuit may include a second phototransistor coupled to the second light-emitting diode. Preferably, the third switching element is switched when the resistance of the second phototransistor is a predetermined value or less.

The second phototransistor may function as part of the time constant circuit in the on-period control circuit by connecting the emitter of the second phototransistor to the control terminal of the second switching element.

The off-period control circuit may include a third series circuit including a capacitor and a second phototransistor that is coupled to the second light-emitting diode. The third series circuit may be connected in parallel with the feedback winding in a direction of the current flowing during the off-period of the first switching element. Preferably, the third switching element is turned off when the charging voltage of the capacitor due to a voltage generated in the feedback winding is a predetermined value or greater.

The off-period control circuit may include a limit circuit for limiting voltage applied to the control terminal of the first switching element. The limit circuit may include the third switching element.

The switching power supply unit may further include a DC voltage source for supplying a driving voltage to the off-period control circuit by utilizing voltage generated in the feedback winding and a constant voltage regulator provided between the input power supply and the output of the DC voltage source and having a function to prevent backward current.

An electronic apparatus according to a preferred embodiment of the present invention includes such a novel switching power supply unit according to preferred embodiments described above.

In the switching power supply unit according to various preferred embodiments of the present invention, in order to keep the output voltage constant, in accordance with a feedback signal sent from the output voltage detection circuit, the on-period control of the first switching element is performed in a rated load mode or a heavier-load mode, and the off-period control of the first switching element is performed in a light-load mode. Thus, the switching frequency in the light-load mode is reduced, thus achieving the reduction in the switching loss. Also, in the rated load or heavy-load mode, the switching frequency is relatively increased or prevented from reducing, thus preventing an increase in the conduction loss.

Also, in the electronic apparatus according to another preferred embodiment of the present invention, the use of the switching power supply unit according to other preferred embodiments of the present invention achieves an improvement in the efficiency.

Other features, elements, characteristics and advantages of the present invention will become more apparent from the following detailed description of preferred embodiments with reference to the attached drawings.

DETAILED DESCRIPTION OF PREFERRED EMBODIMENTS

First Preferred Embodiment

Figure 1:
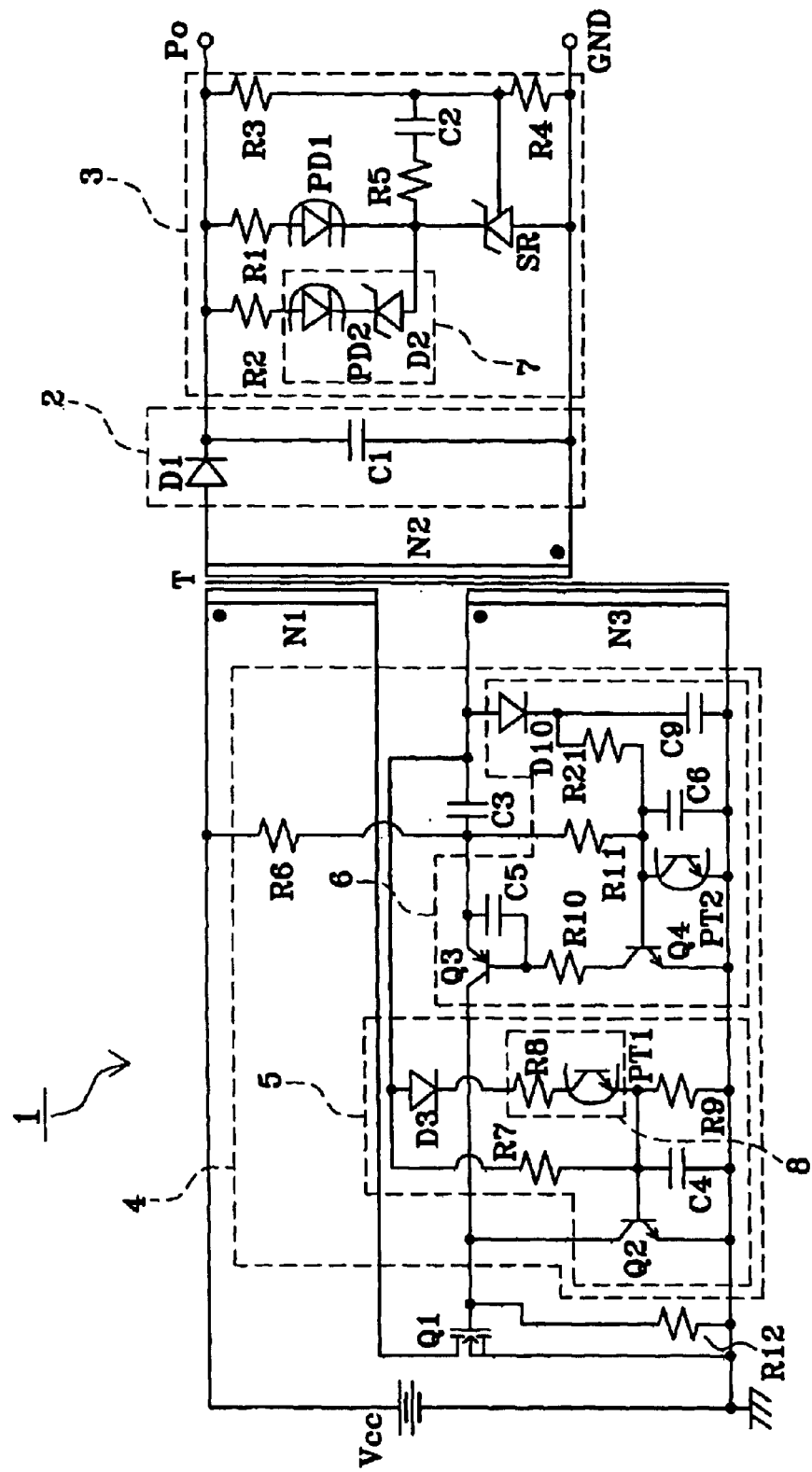
FIG. 1 is a circuit diagram of a switching power supply unit according to a first preferred embodiment of the present invention.
Figure 2A:
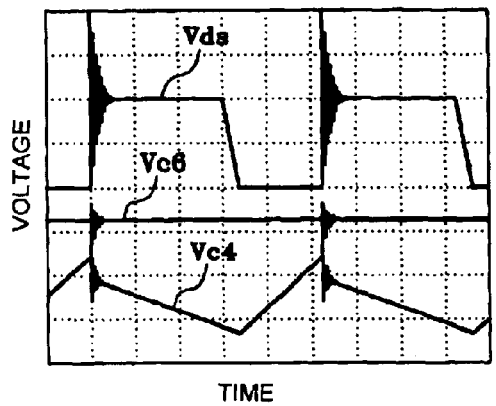
FIG. 2 includes characteristic diagrams showing a relationship between the conditions of loads in predetermined points and the voltage waveforms thereof in the switching power supply unit shown in FIG. 1.
Figure 2B:
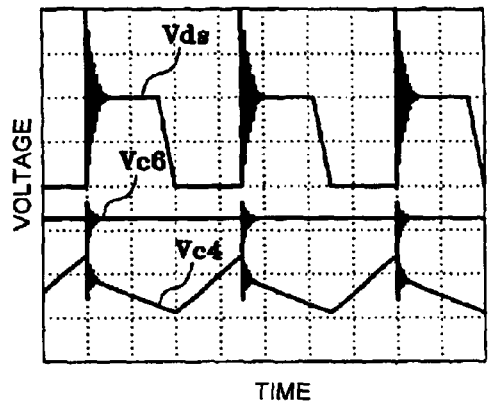
Figure 2C:
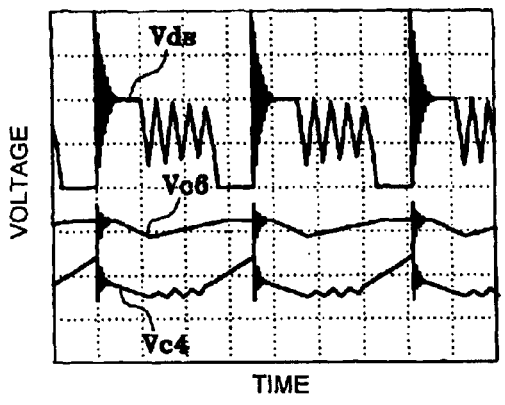
Figure 2D:
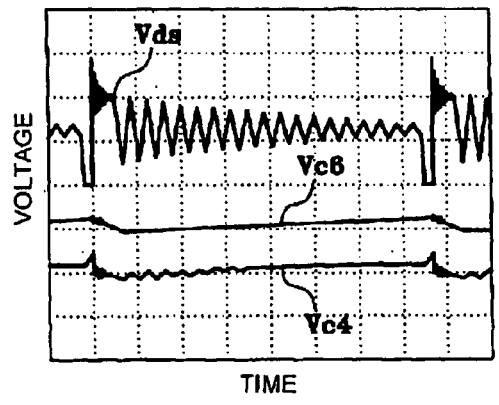

FIG. 1 is a circuit diagram of a switching power supply unit 1 according to a first embodiment of the present invention. Referring to FIG. 1, the switching power supply unit 1 preferably includes a transformer T including a primary winding N1, a secondary winding N2, and a feedback winding N3; a DC power supply Vcc functioning as an input power supply, one end of the DC power supply Vcc being connected to one end of the primary winding N1; a first switching element Q1 including a metal-oxide semiconductor field-effect transistor (MOSFET) and connected between the other end of the primary winding N1 and the other end of the DC power supply Vcc; a rectification circuit 2 connected between the secondary winding N2 and an output terminal Po; an output voltage detection circuit 3 connected to the output terminal Po; and a control circuit 4 provided between one end of the feedback winding N3 and the gate, functioning as a control terminal, of the first switching element Q1. Here, the other end of the DC power supply Vcc is grounded at an input side.

The rectification circuit 2 preferably includes a diode D1 connected to one end of the secondary winding N2 and a smoothing capacitor C1 connected between the cathode of the diode D1 and the other end of the secondary winding N2. Here, the other end of the secondary winding N2 is grounded at an output side.

The output voltage detection circuit 3 preferably includes a resistor R1, a first light-emitting diode PD1, and a shunt regulator SR that are connected in series with each other between the output terminal Po and the ground at the output side; a resistor R3 and a resistor R4 connected in series with each other between the output terminal Po and the ground at the output side; a resistor R2; a first series circuit 7 including a second light-emitting diode PD2 and a Zener diode D2; a resistor R5; and a capacitor C2. The first series circuit 7 is connected in series with the resistor R2 and is connected in parallel with the resistor R1 and the first light-emitting diode PD1. Also, the resistor R5 is connected in series with the capacitor C2. One end of the resistor R5 is connected to a node between the first light-emitting diode PD1 and the shunt regulator SR, and the other end of the resistor R5 is connected to a node between the resistor R2 and the resistor R3. The node between the resistor R2 and the resistor R3 is connected to a control terminal of the shunt regulator SR. The resistor R5 and the capacitor C2 function as a negative feedback circuit for the shunt regulator SR.

The control circuit 4 preferably includes an on-period control circuit 5 connected to the gate of the first switching element Q1; a capacitor C3 and an off-period control circuit 6 connected in series with each other between the one end of the feedback winding N3 and the gate of the first switching element Q1; and a starting resistor R6 connected between the one end of the DC power supply Vcc and a node between the capacitor C3 and the off-period control circuit 6.

The on-period control circuit 5 preferably includes a second switching element Q2, which is an NPN transistor; a resistor R7; a diode D3; a second series circuit 8 including a resistor R8 and a first phototransistor PT1; a resistor R9; and a capacitor C4. The collector and emitter of the second switching element Q2 are connected to the gate and source of the first switching element Q1, respectively. The resistor R7 is connected between the one end of the feedback winding N3 and the base, functioning as a control terminal, of the second switching element Q2. Also, the diode D3 and the second series circuit 8 are connected in series with each other between the one end of the feedback winding N3 and the base of the second switching element Q2. The resistor R9 and the capacitor C4 are each connected between the base and emitter of the second switching element Q2. The first phototransistor PT1 and the first light-emitting diode PD1 function as a photocoupler. A feedback signal that is sent from the output voltage detection circuit 3 to the on-period control circuit 5 via the photocoupler including the first phototransistor PT1 and the first light-emitting diode PD1 is represented by a first feedback signal.

The off-period control circuit 6 includes a third switching element Q3, which is a PNP transistor; a capacitor C5; an NPN transistor Q4; a resistor R10; a resistor R11 a capacitor C6; a second phototransistor PT2; a diode D10; a capacitor C9; and a resistor R21. The emitter and collector of the third switching element Q3 are connected to the capacitor C3 and the gate of the first switching element Q1, respectively. The base of the third switching element Q3 is connected to the collector of the transistor Q4 through the resistor R10. The emitter of the transistor Q4 is connected to the ground at the input side. The base of the transistor Q4 is connected to the emitter of the transistor Q3 through the resistor R11. The base of the transistor Q4 is also connected to the ground at the input side through the capacitor C6 and the second phototransistor PT2. The second phototransistor PT2 and the second light-emitting diode PD2 function as a photocoupler. A feedback signal sent from the output voltage detection circuit 3 to the off-period control circuit 6 via the photocoupler including the second phototransistor PT2 and the second light-emitting diode PD2 is represented by a second feedback signal. Also, the one end of the feedback winding N3 is connected to the other end thereof through the diode D10 and the capacitor C9 in that order. A node between the diode D10 and the capacitor C9 is connected to the base of the transistor Q4 through the resistor R21.

A resistor R12 is connected between the gate and drain of the first switching element Q1. The resistor R12 reduces the impedance between the gate and source of the first switching element Q1, thus preventing the first switching element Q1 from being turned on by a surge or other occurrence.

First, the operation of the switching power supply unit 1 with the arrangement described above in a rated load mode, a heavy-load mode, and the like, other than a light-load mode, will be described. Unless otherwise noted, the term "heavy-load mode" includes a rated load mode in the following explanation.

In the switching power supply unit 1, when the first switching element Q1 is on, magnetic energy is stored in the transformer T by current flowing into the primary winding N1, and when the first switching element Q1 is off, the current flows from the secondary winding N2 to a load connected to the output terminal Po via the rectification circuit 2 by the magnetic energy. In the output voltage detection circuit 3, in accordance with load power, a larger current flows into the first light-emitting diode PD1 as the load is reduced. In the heavy-load mode, the output voltage detection circuit 3 is set so that the voltage drop of the resistor R1 and the first light-emitting diode PD1 due to such current does not exceed the Zener voltage of the Zener diode D2. Thus, in the heavy-load mode, although current flows into the first light-emitting diode PD1, current does not flow into the second light-emitting diode PD2.

If current does not flow into the second light-emitting diode PD2, the second feedback signal is not output. Thus, the second phototransistor PT2 in the off-period control circuit 6 remains off. The capacitor C6 is charged by current flowing from a rectification circuit defined by the diode D10 and the capacitor C9 via the resistor R21. When the voltage of the feedback winding N3 is negative, the capacitor C6 is discharged through the resistor R11 and the second phototransistor PT2. However, since the second phototransistor PT2 is off, only a little electric charge is discharged from the capacitor C6 and only a small voltage drop occurs. Thus, the capacitor C6 is always in a charged state. The charging voltage of the capacitor C6 causes the transistor Q4 to be turned on, and the third switching element Q3 is thus turned on. A flyback voltage is generated in the feedback winding N3 due to absence of the current flowing from the secondary winding N2. Since the third switching element Q3 is on, the flyback voltage is not prevented from being applied from the feedback winding N3 to the gate of the first switching element Q1. Thus, the off-period control circuit 6 does not operate when the load is heavier than or equal to the rated one.

In contrast, since, in accordance with the size of a load, a larger current flows into the first light-emitting diode PD1 as the load is reduced, the first phototransistor PT1 in the on-period control circuit 5 functions, in accordance with the first feedback signal, as a resistor having a resistance that is reduced as the load is reduced and as the current flowing into the first light-emitting diode PD1 is increased.

Also, in the on-period control circuit 5, after the first switching element Q1 is turned on, the capacitor C4 is charged by a voltage generated in the feedback winding N3. When the charging voltage reaches a threshold level of the second switching element Q2, the second switching element Q2 is turned on and thus the first switching element Q1 is turned off. In other words, the on-period control circuit 5 functions to control the period when the first switching element Q1 is on.

The capacitor C4 is charged by current flowing through the diode D3 and the second series circuit 8 (the resistor R8 and the first phototransistor PT1) as well as by the current flowing from the feedback winding N3 via the resistor R7. As described above, the first phototransistor PT1 functions, in accordance with the first feedback signal, as a resistor having a resistance is reduced in accordance with a reduction in the load. Thus, as the load is reduced, the current flowing into the first phototransistor PT1 is increased and the charging rate of the capacitor C4 is thus increased. The increased charging rate of the capacitor C4 causes the second switching element Q2 to be turned on in a shorter time. Thus, the first switching element Q1 is turned off rapidly. As a result of this, the on-period of the first switching element Q1 is reduced. Accordingly, in the heavy-load mode, as the load is reduced, the on-period control circuit 5 reduces the on-period of the first switching element Q1, so that the output voltage is kept constant.

A backward voltage is generated in the feedback winding N3 at the same time as the turning off of the first switching element Q1. Thus, the electric charge in the capacitor C4 is discharged. Accordingly, the operation described above can be repeated.

In the switching power supply unit 1, as described above, in the heavy-load mode, the output voltage is stabilized by controlling the on-period. In this case, since the off-period control circuit 6 does not operate, the first switching element Q1 is turned on by a flyback voltage from the feedback winding N3. Thus, in the switching power supply unit 1, when the first switching element Q1 is on, current flows into the primary winding N1. At the same time as the first switching element Q1 is turned off and no current flows into the primary winding N1, current flows from the secondary winding N2. Then, at the same time as no current flows from the secondary winding N2, the first switching element Q1 is turned on and thus the current flows into the primary winding N1. Accordingly, the above-described operation is repeated in a critical current mode.

Next, the operation of the switching power supply unit 1 in the light-load mode will be described.

In the on-period control circuit 5, the first phototransistor PT1 functions as a resistor in accordance with the first feedback signal. However, when the resistance of the first phototransistor PT1 is substantially lower than the resistance of the resistor R8 connected in series with the first phototransistor PT1, a change in the resistance of the first phototransistor PT1 does not influence the operation of the on-period control circuit 5. More specifically, although an increased current flowing into the first light-emitting diode PD1 due to a lighter-load causes the resistance of the first phototransistor PT1 to be substantially low, the impedance of the second series circuit 8 does not fall below the resistance of the resistor R8 due to the presence of the resistor R8. Thus, since the on-period cannot be further reduced, the on-period control circuit 5 does not function as a circuit for controlling the on-period. This means that the first feedback signal is not practically output despite of light emission by the first light-emitting diode PD1. Thus, the resistance of the resistor R8 must be preset to be higher than a case where a circuit for controlling the off-mode is not provided.

When the on-period control circuit 5 does not operate despite of a light load, since the on-period cannot be further reduced, the switching power supply unit 1 becomes out of control and the output voltage increases suddenly. In this time, a voltage higher than the Zener voltage of the Zener diode D2 is applied to the series circuit defined by the resistor R1 and the first light-emitting diode PD1 in the output voltage detection circuit 3. Thus, a further larger current flows into the first light-emitting diode PD1. Also, a current corresponding to the size of the load flows into the second light-emitting diode PD2, and the second feedback signal is output.

In the off-period control circuit 6, the second phototransistor PT2 is turned on by the second feedback signal and functions as a resistor having a resistance based on the second feedback signal. In this case, the electric charge in the capacitor C6 is discharged through the resistor R11 and the second phototransistor PT2 during the off-period of the first switching element Q1. The charging voltage falls to the threshold level of the transistor Q4 or less, and the transistor Q4 is turned off. Thus, the third switching element Q3 is also turned off. As a result of this, although the absence of the current flowing from the secondary winding N2 generates a flyback voltage in the feedback winding N3, the flyback voltage is prevented from being applied to the gate of the first switching element Q1. Not applying the flyback voltage to the gate of the first switching element Q1 means that the turning on of the first switching element Q1 is prevented, so that the off-period is prolonged.

After the energy of the transformer T is discharged through the diode D1, the voltage of the feedback winding N3 is changed from negative to ringing. Since the voltage of the feedback winding N3 is not negative, the capacitor C6 is not discharged through the resistor R11. Thus, the capacitor C6 is started to be charged again in accordance with a time constant determined from the resistor R21, the second phototransistor PT2, and the capacitor C6. Thus, an increase in the charging voltage of the capacitor C6 causes the transistor Q4 to be turned on, and the third switching element Q3 is thus turned on. When the third switching element Q3 is turned on, the collector voltage of the third switching element Q3, or the gate voltage of the first switching element Q1 is increased by the electric charge stored in the capacitor C3, and the first switching element Q1 is turned on. Accordingly, the off-period control circuit 6 controls the off-period of the first switching element Q1 in accordance with the second feedback signal.

As the load is reduced, the current flowing into the second light-emitting diode PD2 is increased and the resistance of the second phototransistor PT2 is reduced. Thus, a longer time is needed for charging the capacitor C6 to an extent that the transistor Q4 is turned on. As a result of this, as the load is reduced, the off-period of the first switching element Q1 is increased. By such a function of the off-period control circuit 6, the output voltage is kept constant. In this case, the switching power supply unit 1 operates in a discontinuous current mode.

The switching power supply unit 1 operates in the discontinuous current mode in the light-load mode because the off-period control is performed as described above. By performing the off-period control, the switching power supply unit 1 is inevitably operated in the discontinuous current mode. Thus, if the off-period control circuit 6 operates in the heavy-load mode without the on-period control circuit 5, the off-period control is performed even in the heavy-load mode. If the off-period control is performed, the switching frequency increases in accordance with an increase in the load, which is opposite to a normal RCC type. In switching power supply units, since the switching loss relatively increases in a lighter-load mode, a lower switching frequency is desired in the lighter-load mode. In contrast, since the conduction loss relatively increases in a heavier-load mode, a higher switching frequency is desired in the heavier-load mode. The off-period control meets these desires.

However, when the off-period is controlled, a switching power supply unit always operates in the discontinuous current mode. Thus, there is a limitation on the increase in the switching frequency. Moreover, for sufficiently reducing the switching frequency in the light-load mode, the switching frequency in the heavy-load mode becomes much lower than the normal RCC type. Thus, the conduction loss may be increased. In the switching power supply unit 1, performing the off-period control only in the light-load mode prevents such problems.

FIG. 2 shows measurement results of time change waveforms of a voltage Vds between the drain and source of the first switching element Q1, a voltage Vc6 across the capacitor C6, and a voltage Vc4 across the capacitor C4 in the switching power supply unit 1 according to preferred embodiments of the present invention. Part (a) shows a rated load mode in which the on-period control is performed. Part (b) shows a state just before changing from the on-period control to the off-period control due to a load lighter than the rated load. Part (c) shows a light-load mode in which the off-period control is performed. Part (d) shows an almost no-load mode with a much lighter load.

As shown in Parts (a) and (b) of FIG. 2, in the state under the control of the on-period, the voltage Vc6 across the capacitor C6 in the off-period control circuit 6 is approximately constant at a level at which the transistor Q4 is turned on. This shows that the off-period control circuit 6 is not operating. Also, the switching period in Part (b) of FIG. 2 is shorter than that of Part (a) of FIG. 2. This shows that the on-period control circuit 5 is operating. Also, Parts (a) and (b) of FIG. 2 show that the second switching element Q2 is tuned on (the first switching element Q1 is turned off) when the charging voltage Vc4 of the capacitor C4 reaches the peak. As is clear from comparing Parts (a) and (b) with Parts (c) and (d), since the voltage Vds does not exhibit ringing in Parts (a) and (b), the switching power supply unit 1 is operating in the continuous current mode.

As shown in Parts (c) and (d) of FIG. 2, the voltage Vc6 across the capacitor C6 in the off-period control circuit 6 periodically varies in the light-load mode. This shows that the off-period control circuit 6 is operating. The voltage Vc6 across the capacitor C6 exhibits the minimum value at the point of time when no current flows from the secondary winding N2 and the voltage Vds between the drain and source of the first switching element Q1 starts ringing (when a flyback voltage is generated in the feedback winding N3). This shows that the transistor Q4 is in the off-state and thus the third switching element Q3 is in the off-state, thus preventing the flyback voltage from being applied to the gate of the first switching element Q1. Also, by such an operation, the switching power supply unit 1 inevitably operates in the discontinuous current mode.

Figure 3:
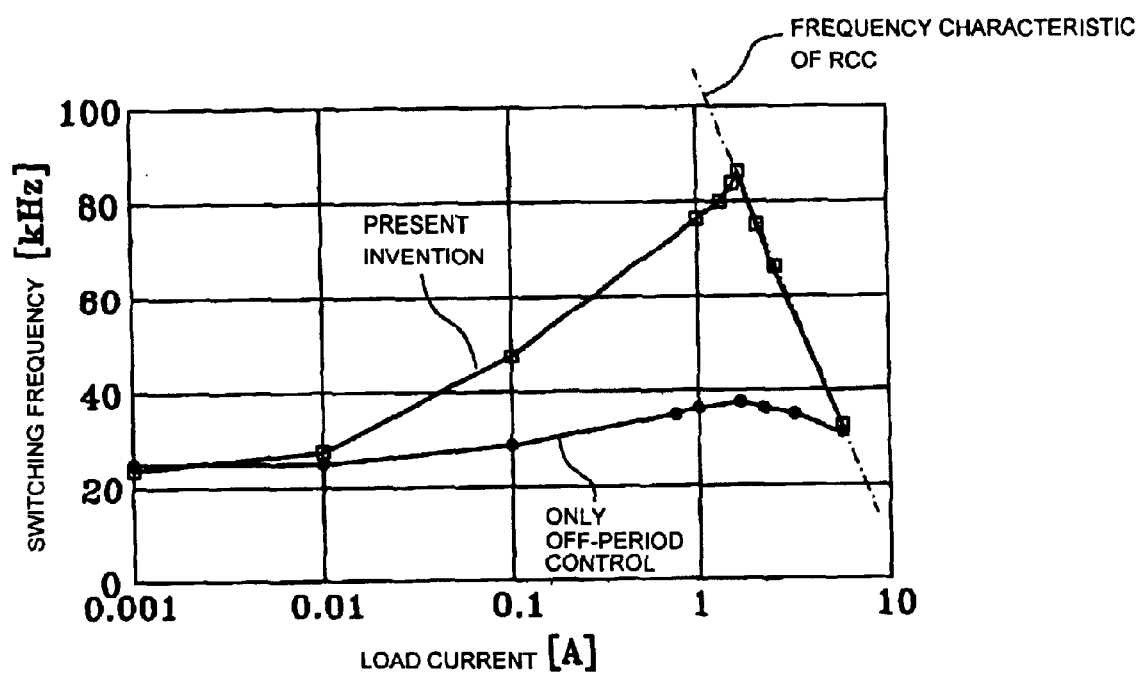
FIG. 3 is a characteristic diagram showing a relationship between a load current and the switching frequency of the switching power supply unit shown in FIG. 1.
Figure 4:
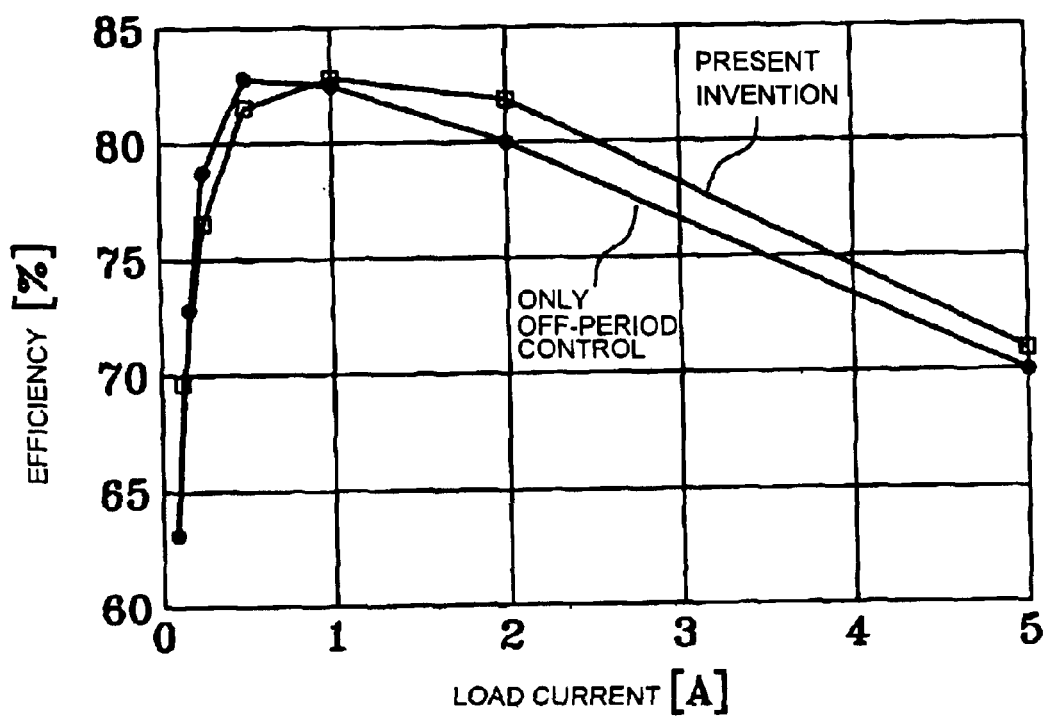
FIG. 4 is a characteristic diagram showing a relationship between the load current and the efficiency of the switching power supply unit shown in FIG. 1.

FIGS. 3 and 4 show the relationship between a load current and the switching frequency and the relationship between the load current and the efficiency, respectively, in the switching power supply unit 1 according to preferred embodiments of the present invention by comparing with a case where only the off-period control is performed.

As is clear from FIGS. 3 and 4, in the light-load mode with a small load current, there is no big difference between preferred embodiments of the present invention and the case where only the off-period control is performed, with respect to the switching frequency and the efficiency. In contrast, with a load heavier than or equal to a predetermined level, the switching frequency in preferred embodiments of the present invention is higher than that in the case where only the off-period control is performed, and thus better efficiency is achieved in preferred embodiments of the present invention.

As described above, in the switching power supply unit 1 according to preferred embodiments of the present invention, in order to stabilize the output voltage, the on-period control is performed in the rated load or a heavier-load mode, and the off-period control is performed in a lighter-load mode. Thus, in the light-load mode, the switching frequency is drastically reduced, so that the switching loss is reduced. In the rated load mode or a heavier-load mode, unnecessary reduction in the switching frequency under the influence of the off-period control is prevented, thus preventing an increase in the conduction loss.

Second Preferred Embodiment

Figure 5:
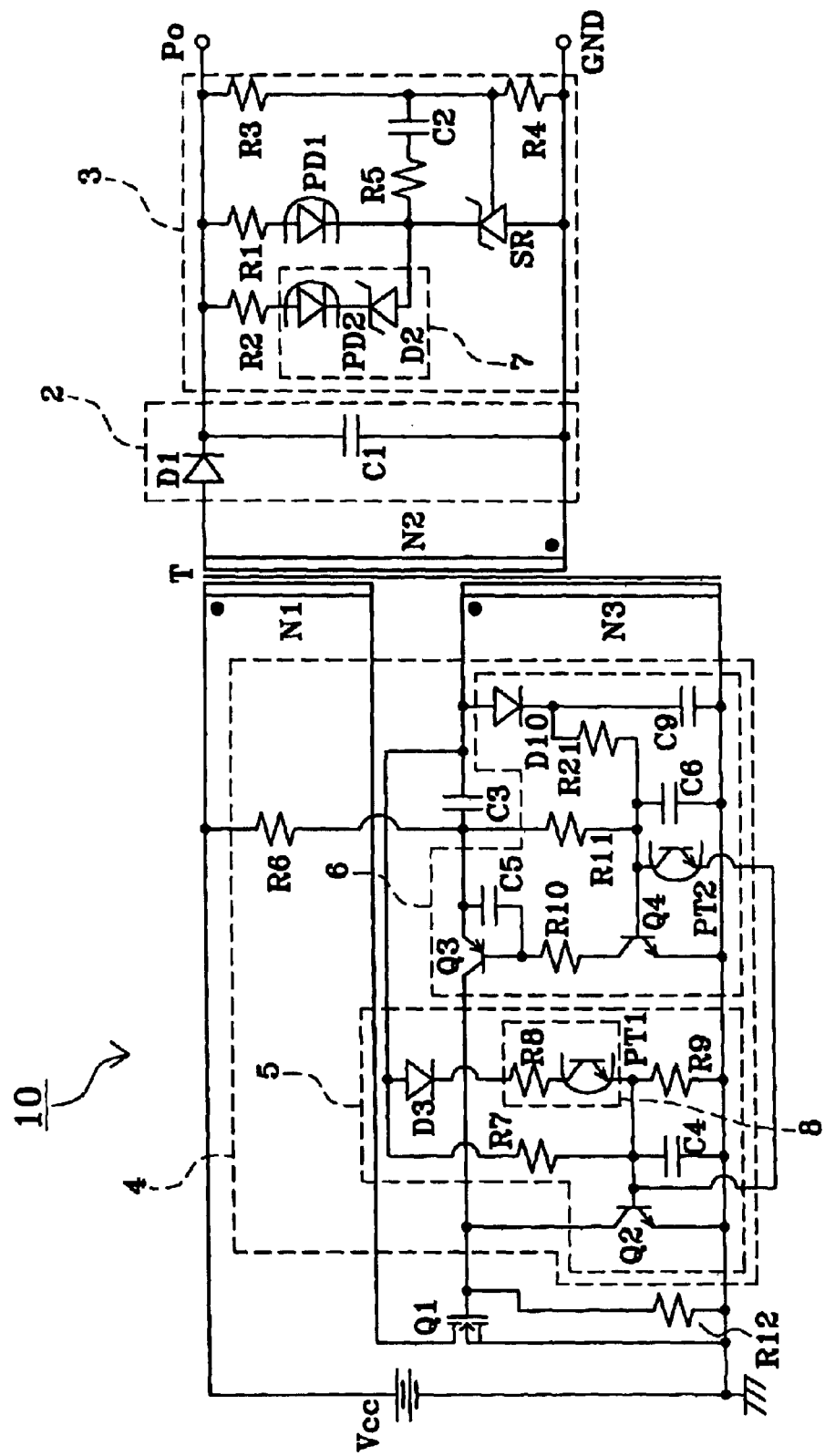
FIG. 5 is a circuit diagram of a switching power supply unit according to a second preferred embodiment of the present invention.

FIG. 5 is a circuit diagram of a switching power supply unit 10 according to a second preferred embodiment of the present invention. In FIG. 5, the same or similar elements as in FIG. 1 are referred to with the same reference numerals and the descriptions of those elements will not be repeated.

The switching power supply unit 10 shown in FIG. 5 is different from the switching power supply unit 1 shown in FIG. 1 only in that the emitter of the second phototransistor PT2 in the off-period control circuit 6 is connected to the base of the second switching element Q2 in the on-period control circuit 5, instead of being connected to the ground at the input side.

In the switching power supply unit 10 with the arrangement described above, in the heavy-load mode, since no current flows into the second light-emitting diode PD2, as in the switching power supply unit 1, the off-period control circuit 6 does not operate, and the on-period control is performed.

In the light-load mode, in the switching power supply unit 1 shown in FIG. 1, since the resistance of the first phototransistor PT1 is substantially lower than the resistance of the resistor R8, the first feedback signal is not practically output from the first light-emitting diode PD1. The current flows into the second light-emitting diode PD2, thus operating the off-period control circuit 6.

In contrast, in the switching power supply unit 10, since the emitter of the second phototransistor PT2 is connected to the base of the second switching element Q2 in the on-period control circuit 5 instead of being connected to the ground at the input side, the current flowing into the second phototransistor PT2 is also used as a charging current for the capacitor C4 in the on-period control circuit 5. More specifically, the second phototransistor PT2 functions as part of a time constant circuit in the on-period control circuit 5. When the load is reduced and the current flowing into the second light-emitting diode PD2 is increased, the current flowing into the second phototransistor PT2 is also increased in accordance with the current flowing into the second light-emitting diode PD2. Thus, the charging time of the capacitor C4 is reduced. As a result of this, the second switching element Q2 is turned on in a shorter time, and the first switching element Q1 is turned off in a shorter time. In other words, in the light-load mode, the on-period is controlled to be shorter in an auxiliary manner. In such a case, in the light-load mode, the switching frequency of the switching power supply unit 10 is higher than that of the switching power supply unit 1.

In the switching power supply unit 1, since only the off-period control is performed in the light-load mode, an extremely light-load or no-load mode may cause noise due to an extreme reduction of the switching frequency. In contrast, in the switching power supply unit 10, in the light-load mode, the control of the on-period is performed in the auxiliary manner as well as the control of the off-period. Thus, a predetermined switching frequency or more can be achieved and thus noise can be prevented.

Third Preferred Embodiment

Figure 6:
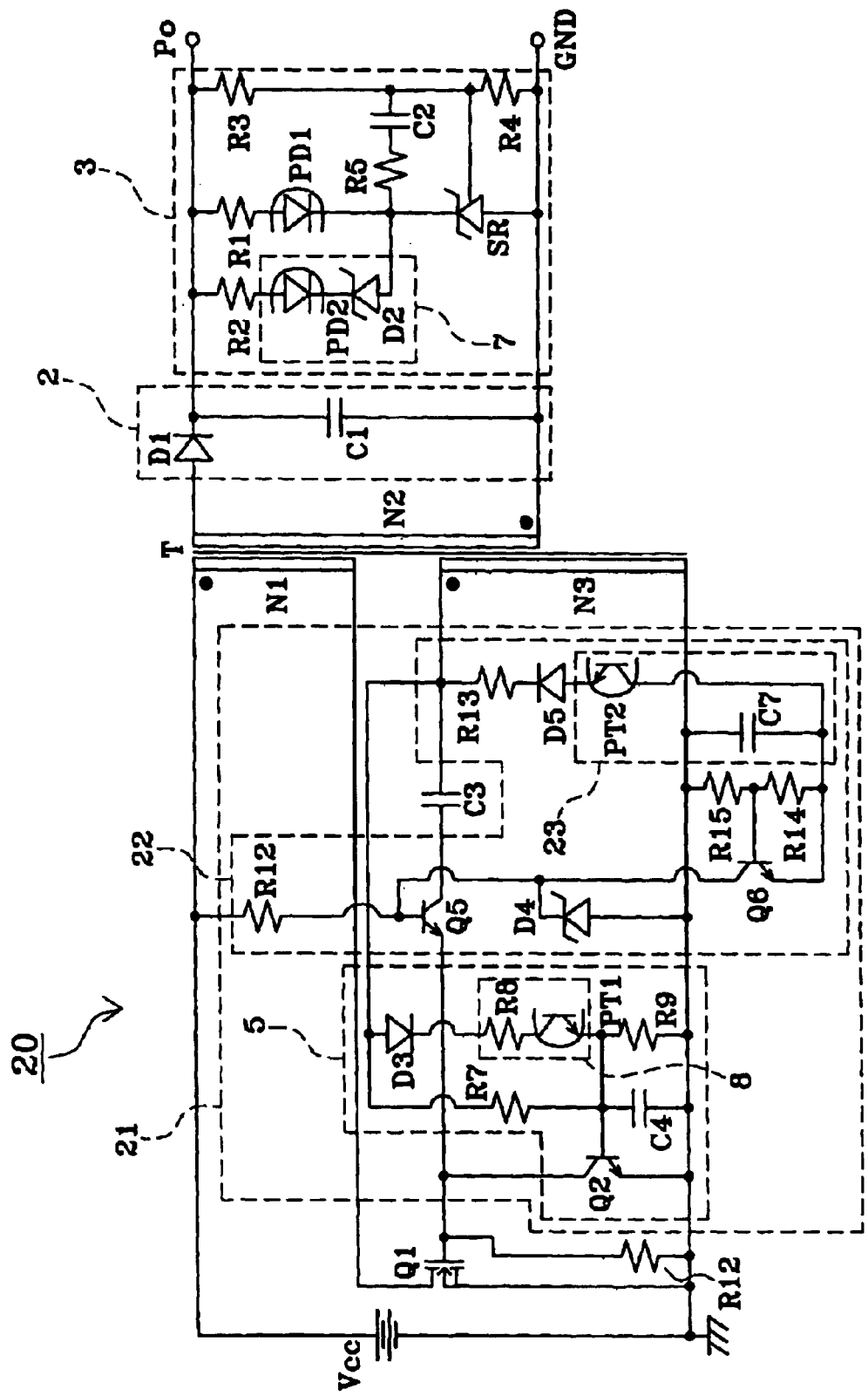
FIG. 6 is a circuit diagram of a switching power supply unit according to a third preferred embodiment of the present invention.

FIG. 6 is a circuit diagram of a switching power supply unit 20 according to a third preferred embodiment of the present invention. In FIG. 6, the same or similar elements as in FIG. 1 are referred to with the same reference numerals and the descriptions of those elements will not be repeated.

The switching power supply unit 20 shown in FIG. 6 is different from the switching power supply unit 1 shown in FIG. 1 only in that a control circuit 21 is provided in place of the control circuit 4. In the control circuit 21, the starting resistor R6 in the control circuit 4 is deleted and an off-period control circuit 22 is provided in place of the off-period control circuit 6. There is no change to the on-period control circuit 5.

The off-period control circuit 22 preferably includes a third switching element Q5, which is an NPN transistor; a resistor R12 practically functioning as a starting resistor; a Zener diode D4; an NPN transistor Q6; resistors R13, R14, and R15; a capacitor C7; the second phototransistor PT2; and a diode D5. The collector and emitter of the third switching element Q5 are connected to the capacitor C3 and the gate of the first switching element Q1, respectively. The base of the third switching element Q5 is connected to the one end of the DC power supply Vcc through the resistor R12 and is also grounded at the input side through the Zener diode D4. The resistor R13, the diode D5, the second phototransistor PT2, and the capacitor C7 are connected in series with each other and are connected in parallel with the feedback winding N3. The second phototransistor PT2 and the capacitor C7 constitute a third series circuit 23. The collector of the transistor Q6 is connected to the base of the third switching element Q5 and the emitter of the resistor Q6 is connected to a node between the second phototransistor PT2 and the capacitor C7. The resistor R14 is connected between the base and emitter of the transistor Q6 and the resistor R15 is connected between the base of the transistor Q6 and the ground at the input side.

The second phototransistor PT2 and the second light-emitting diode PD2 function as a photocoupler, as in the switching power supply unit 1. A signal that is fed back from the output voltage detection circuit 3 to the off-period control circuit 22 via the photocoupler including the second phototransistor PT2 and the second light-emitting diode PD2 is represented by a second feedback signal in the switching power supply unit 20.

First, the operation of the switching power supply unit 20 with the arrangement described above in the heavy-load mode will be described.

In the switching power supply unit 20, since no current flows into the second light-emitting diode PD2 in the heavy-load mode, as in the switching power supply unit 1 shown in FIG. 1, the second phototransistor PT2 in the off-period control circuit 22 remains off. Since no current flows into the transistor Q6 when the second phototransistor PT2 is off, the transistor Q6 is also off. Thus, the base voltage of the third switching element Q5 is equal to the Zener voltage of the Zener diode D4, and the third switching element Q5 is turned on. In this case, a flyback voltage is not prevented from being applied from the feedback winding N3 to the gate of the first switching element Q1. Therefore, the off-period control circuit 22 does not operate in the heavy-load mode.

The on-period control circuit 5 in the switching power supply unit 20 is identical to that in the switching power supply unit 1 shown in FIG. 1. Thus, the on-period control is performed in the heavy-load mode.

In contrast, in the light-load mode, the second feedback signal is generated due to the current flowing into the second light-emitting diode PD2. Thus, the off-period control circuit 22 operates.

When the first switching element Q1 is turned off and current flows from the secondary winding N2 via the diode D1, the voltage of the other end of the feedback winding N3 is higher than that of the one end thereof. Here, when the current flowing into the second light-emitting diode PD2 generates the second feedback signal, the second phototransistor PT2 functions as a resistor having a resistance based on the second feedback signal. Thus, the current flows into a series circuit including the third series circuit 23, the diode D5, and the resistor R13. Therefore, the capacitor C7 is charged in such a manner that the side connected to the ground at the input side is positive. Since the resistance of the second phototransistor PT2 is reduced in accordance with the reduction in the load, the current flowing into the capacitor C7 is increased and thus the charging voltage of the capacitor C7 is increased. At the same time, the charging voltage of the capacitor C7 is applied to the resistors R15 and R14. Thus, at the time point when the charging voltage of the capacitor C7 reaches a predetermined level or more, the transistor Q6 is turned on. As a result of this, the base voltage of the third switching element Q5 is reduced and the third switching element Q5 is thus turned off.

When the current flowing from the secondary winding N2 via the diode D1 reaches zero, a flyback voltage whose sign is opposite to the previous state is generated in the feedback winding N3. In this time, since the electric charge in the capacitor C7 is discharged through the resistors R14 and R15, the transistor Q6 remains on. Thus, the third switching element Q5 remains off. During the off-state of the third switching element Q5, the flyback voltage is prevented from being applied to the gate of the first switching element Q1. Not applying the flyback voltage to the gate of the first switching element Q1 means that the turning on of the first switching element Q1 is prevented, so that the off-period is prolonged.

The on-period of the transistor Q6 is determined depending on the period when the capacitor C7 is discharged, and the discharging period of the capacitor C7 depends on the charging voltage of the capacitor C7. Since, as described above, the charging voltage of the capacitor C7 is increased in accordance with the reduction of the load, the on-period of the transistor Q6 is increased and the off-period of the third switching element Q5, that is, the off-period of the first switching element Q1 is increased in accordance with the reduction in the load. During this time, the flyback voltage is attenuated while oscillating.

When the transistor Q6 is turned off due to the reduction in the electric charge of the capacitor C7, the base voltage of the third switching element Q5 is increased and the third switching element Q5 is thus turned on. Turning on of the third switching element Q5 allows an increase in the gate voltage of the first switching element Q1 by the current flowing via the base and emitter of the third switching element Q5, thus turning on the first switching element Q1. Accordingly, the off-period control circuit 22 controls the off-period of the first switching element Q1 in accordance with the second feedback signal. In other words, in the switching power supply unit 20, the output voltage is kept constant by the off-period control in the light-load mode.

In the switching power supply unit 20, unlike in the switching power supply unit 1 shown in FIG. 1 or the switching power supply unit 10 shown in FIG. 5, the off state of the third switching element Q5 is maintained by utilizing the voltage generated in the feedback winding N3 when the first switching element Q1 is off, as described above. Also, the base voltage of the third switching element Q5 during the off-period of the first switching element Q1 is kept below the ground potential. In the switching power supply unit 1 and the switching power supply unit 10, since there is no path for maintaining the off-state of the third switching element Q3, the third switching element Q3 may be turned on due to a surge or other occurrence in the circuit. In the switching power supply unit 20, however, due to the circuit arrangement, turning off of the third switching element Q5 is ensured by the voltage generated in the feedback winding N3 when the first switching element Q1 is off. Thus, the possibility of an incorrect or undesired operation due to a voltage surge or the like can be reduced.

Fourth Preferred Embodiment

Figure 7:
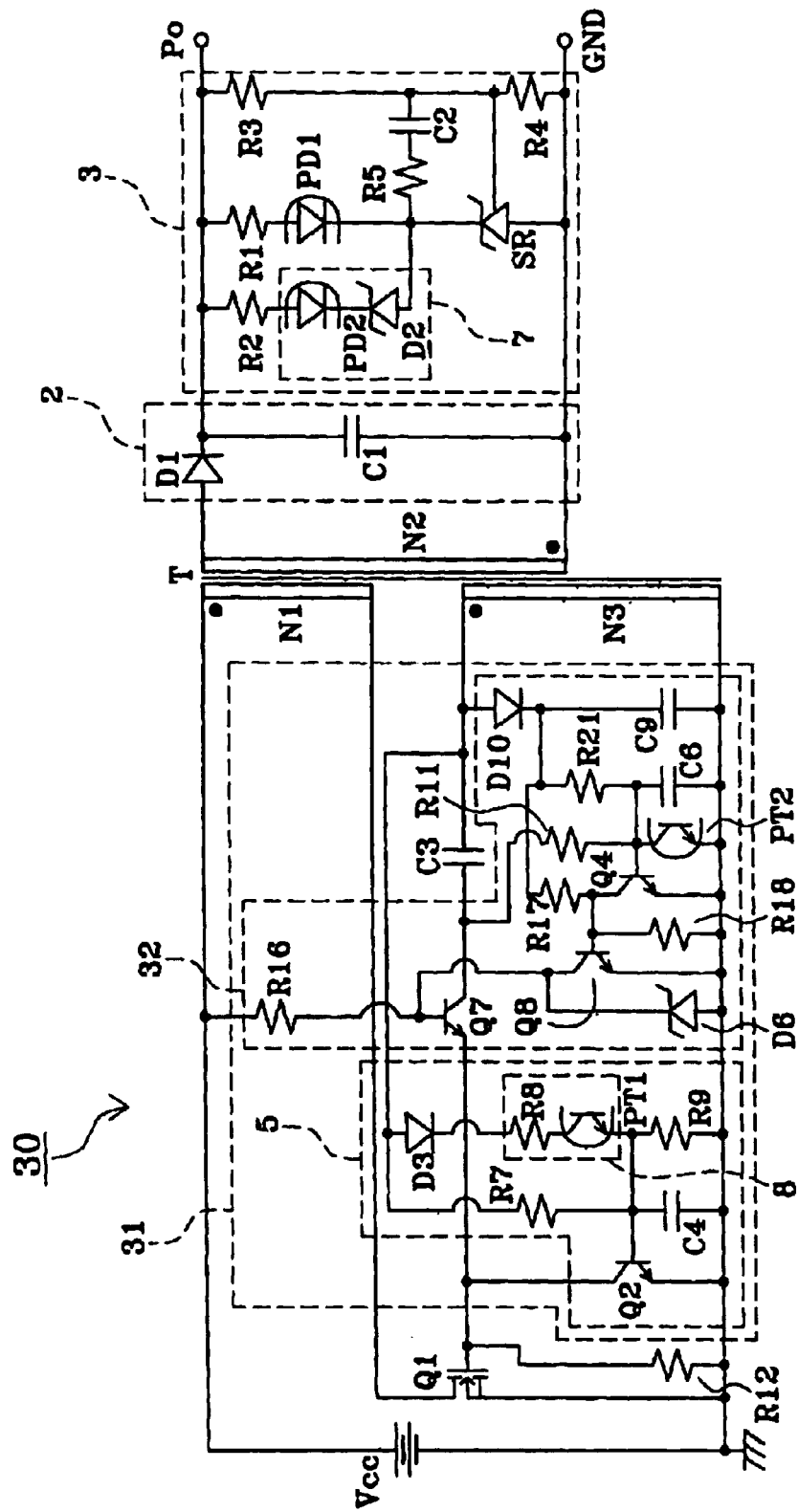
FIG. 7 is a circuit diagram of a switching power supply unit according to a fourth preferred embodiment of the present invention.

FIG. 7 is a circuit diagram of a switching power supply unit 30 according to a fourth preferred embodiment of the present invention. In FIG. 7, the same or similar elements as in FIG. 1 are referred to with the same reference numerals and the descriptions of those elements will not be repeated.

The switching power supply unit 30 shown in FIG. 7 is different from the switching power supply unit 1 shown in FIG. 1 only in that a control circuit 31 is provided in place of the control circuit 4. In the control circuit 31, the starting resistor R6 in the control circuit 4 is deleted and an off-period control circuit 32 is provided in place of the off-period control circuit 6. There is no change to the on-period control circuit 5.

The off-period control circuit 32 includes a third switching element Q7, a transistor Q8, a Zener diode D6, and resistors R16, R17, and R18 in place of the third switching element Q3 in the control circuit 4, the capacitor C5, and the resistor R10 shown in FIG. 1. Here, the third switching element Q7 is an NPN transistor, and the collector and emitter of the third switching element Q7 are connected to the capacitor C3 and the gate of the first switching element Q1, respectively. The resistor R16 practically functions as a starting resistor and is connected between the base of the third switching element Q7 and the one end of the DC power supply Vcc. The Zener diode D6 is connected between the base of the third switching element Q7 and the ground at the input side. The collector and emitter of the transistor Q8 are connected to the base of the third switching element Q7 and the ground at the input side, respectively. The base of the transistor Q8 is connected to the ground at the input side through the resistor R18 and is also connected to the collector of the transistor Q4. Moreover, the base of the transistor Q8 is connected to a node between the diode D10 and the capacitor C9 through the resistor R17.

First, the operation of the switching power supply unit 30 with the arrangement described above in a rated load mode, a heavy-load mode, and the like, other than a light-load mode, will be described.

In the switching power supply unit 30, since in the heavy-load mode, no current flows into the second light-emitting diode PD2, as in the switching power supply unit 1 shown in FIG. 1, the second phototransistor PT2 in the off-period control circuit 32 remains off. When the second phototransistor PT2 is turned off, the transistor Q4 is turned on due to the charging voltage of the capacitor C6, and the transistor Q8 is thus turned off. Thus, the base of the third switching element Q7 is equal to the Zener voltage of the Zener diode D6, and the third switching element Q7 is turned on. In this case, a flyback voltage is not prevented from being applied from the feedback winding N3 to the gate of the first switching element Q1. Consequently, the off-period control circuit 32 does not operate in the heavy-load mode.

Since the on-period control circuit 5 is identical to that in the switching power supply unit 1 shown in FIG. 1, the on-period control is performed in the heavy-load mode.

In the light-load mode, in contrast, the second feedback signal is generated due to the current flowing into the second light-emitting diode PD2. Thus, the off-period control circuit 32 operates. The operation of the off-period control circuit 32 will be described.

As in the off-period control circuit 6 in the switching power supply unit 1 shown in FIG. 1, during the off-period of the first switching element Q1, the electric charge in the capacitor C6 is discharged through the resistor R11 and the second phototransistor PT2. When the charging voltage falls to the threshold level of the transistor Q4 or less, the transistor Q4 is turned off. Thus, the transistor Q8 is turned on and the third switching element Q7 is thus turned off. As a result of this, when the absence of the current flowing from the secondary winding N2 generates a flyback voltage in the feedback winding N3, the flyback voltage is prevented from being applied to the gate of the first switching element Q1.

More specifically, in the switching power supply unit 30, the third switching element Q7 in the off-period control circuit 32 is an NPN transistor, unlike the third switching element Q3, which is a PNP transistor, in the off-period control circuit 6 shown in FIG. 1. Thus, the switching power supply unit 30 is different from the switching power supply unit 1 shown in FIG. 1 only in that a logic inverting circuit is inserted between the transistor Q4 and the third switching element Q7. Thus, the operation of the switching power supply unit 30 is almost the same as the switching power supply unit 1.

Operational effects of the switching power supply unit 30 will be explained by comparing with the switching power supply unit 1 shown in FIG. 1 that uses a PNP transistor as the third switching element Q3.

In the switching power supply unit 1, starting conditions are represented as follows:

$$vcc \times ra/(r6+ra) > Vth(Q1),$$

where vcc represents the voltage of the DC power supply Vcc, ra represents the parallel resistance of the resistors R10 and R12 (resistors provided between the gate and source of the first switching element Q1), r6 represents the resistance of the resistor R6, and Vth (Q1) represents a threshold voltage of the first switching element Q1. Here, the voltage drop of the third switching element Q3 and the transistor Q4 is ignored.

The resistance of the resistor R10 affects the switching rate of the third switching element Q3. As the resistance of the resistor R10 increases, the base current of the third switching element Q3 is reduced. In accordance with the reduction in the base current of the third switching element Q3, the current supplied to the gate of the first switching element Q1 is reduced, and the switching rate of the first switching element Q1 is thus reduced. Since the reduction in the switching rate of the first switching element Q1 causes an increase in the switching loss, the resistance of the resistor R10 cannot be considerably increased. If the resistance of the resistor R10 cannot be considerably increased, the resistance of the resistor R6 cannot be considerably increased under the starting conditions. Since the resistor R6 is a starting resistor, if the resistance of the resistor R6 cannot be considerably increased, the loss of the resistor R6 cannot be reduced.

In contrast, in the switching power supply unit 30 that uses an NPN transistor as the third switching element Q7, starting conditions are represented as follows:

$$vcc \times r12/(r16+r12) > Vth(Q1),$$

where r16 represents the resistance of the resistor R16.

As long as the resistance of the resistor R12 in the switching power supply unit 1 is equal to the resistance of the resistor R12 in the switching power supply unit 30, the resistance of the resistor R6 in the switching power supply unit 1 must be lower than the resistance of the resistor R16 in the switching power supply unit 30 due to the starting conditions. Thus, in the switching power supply unit 30, the loss of the resistor R16, which corresponds to a starting resistor, can be reduced.

Accordingly, in the switching power supply unit 30, the use of the NPN transistor as the third switching element Q7 achieves the reduction in the loss of the starting resistor.

In the switching power supply unit 30 shown in FIG. 7, the Zener diode D6 is connected between the base of the third switching element Q7 and the other end of the DC power supply Vcc, as described above. The Zener diode D6 and the third switching element Q7 constitute a limit circuit, thus limiting the gate voltage (control voltage) of the first switching element Q1 not to exceed a predetermined range. More specifically, the maximum gate voltage of the first switching element Q1 is limited to as follows:

$$Vgs(Q1) = Vz(D6) - Vbe(Q7),$$

where Vgs (Q1) represents the voltage between the gate and source of the first switching element Q1, Vz(D6) represents the Zener voltage of the Zener diode D6, and Vbe(Q7) represents the voltage between the base and emitter of the third switching element Q7. Thus, even in a switching power supply unit applicable to a world-wide input range that can be used for a wide input voltage range, the control voltage of the first switching element Q1 is prevented from exceeding the predetermined range.

The structure of a starting circuit in the switching power supply unit 20 shown in FIG. 6 is almost identical to that in the switching power supply unit 30 and the switching power supply unit 20 also includes a limit circuit although such an explanation has been omitted in the above description. Thus, the loss of the starting resistor can be reduced in the switching power supply unit 20 and the switching power supply unit 20 is applicable to a wide input voltage range, as in the switching power supply unit 30.

Fifth Preferred Embodiment

Figure 8:
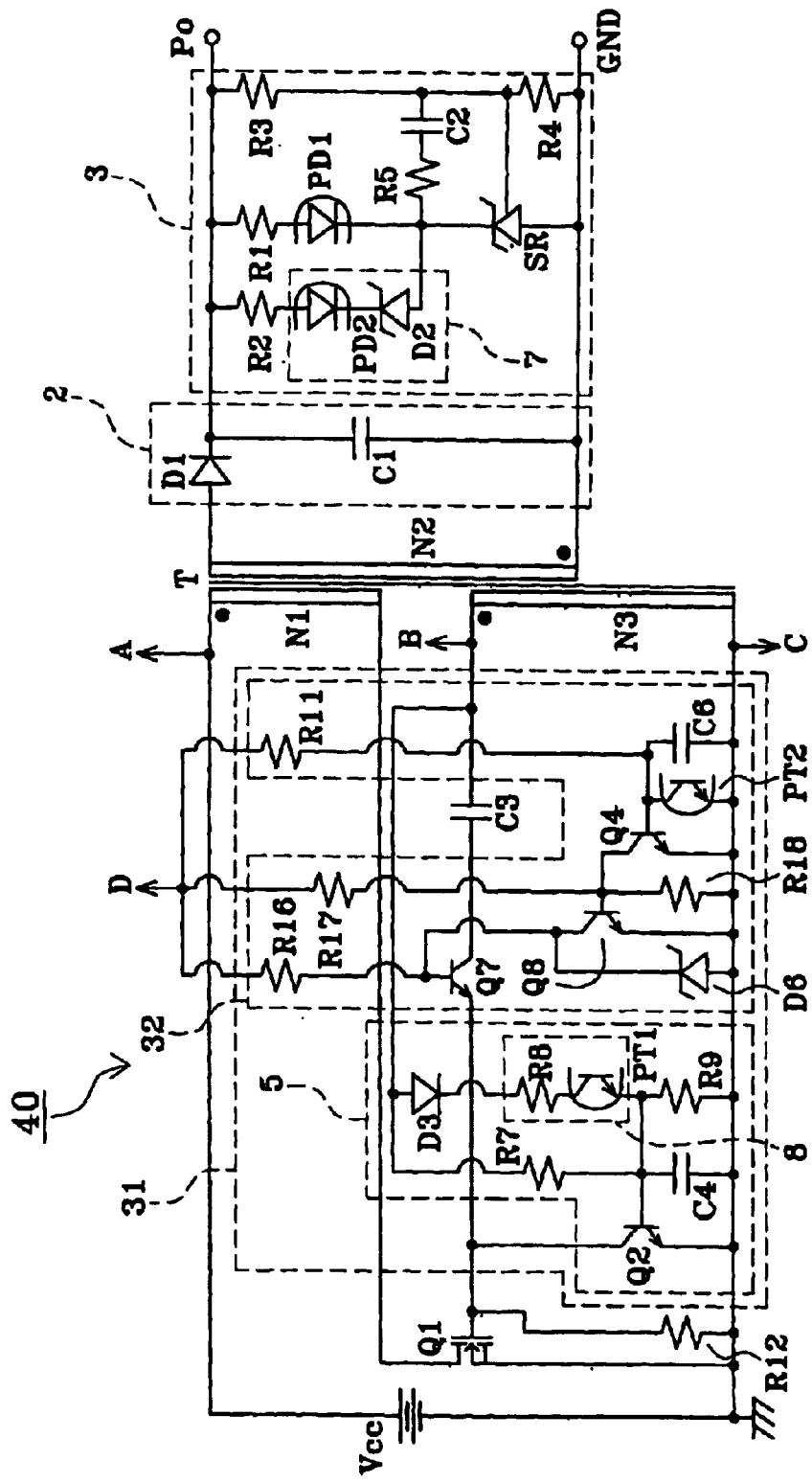
FIG. 8 is a major portion of a circuit diagram of a switching power supply unit according to a fifth preferred embodiment of the present invention.
Figure 9:
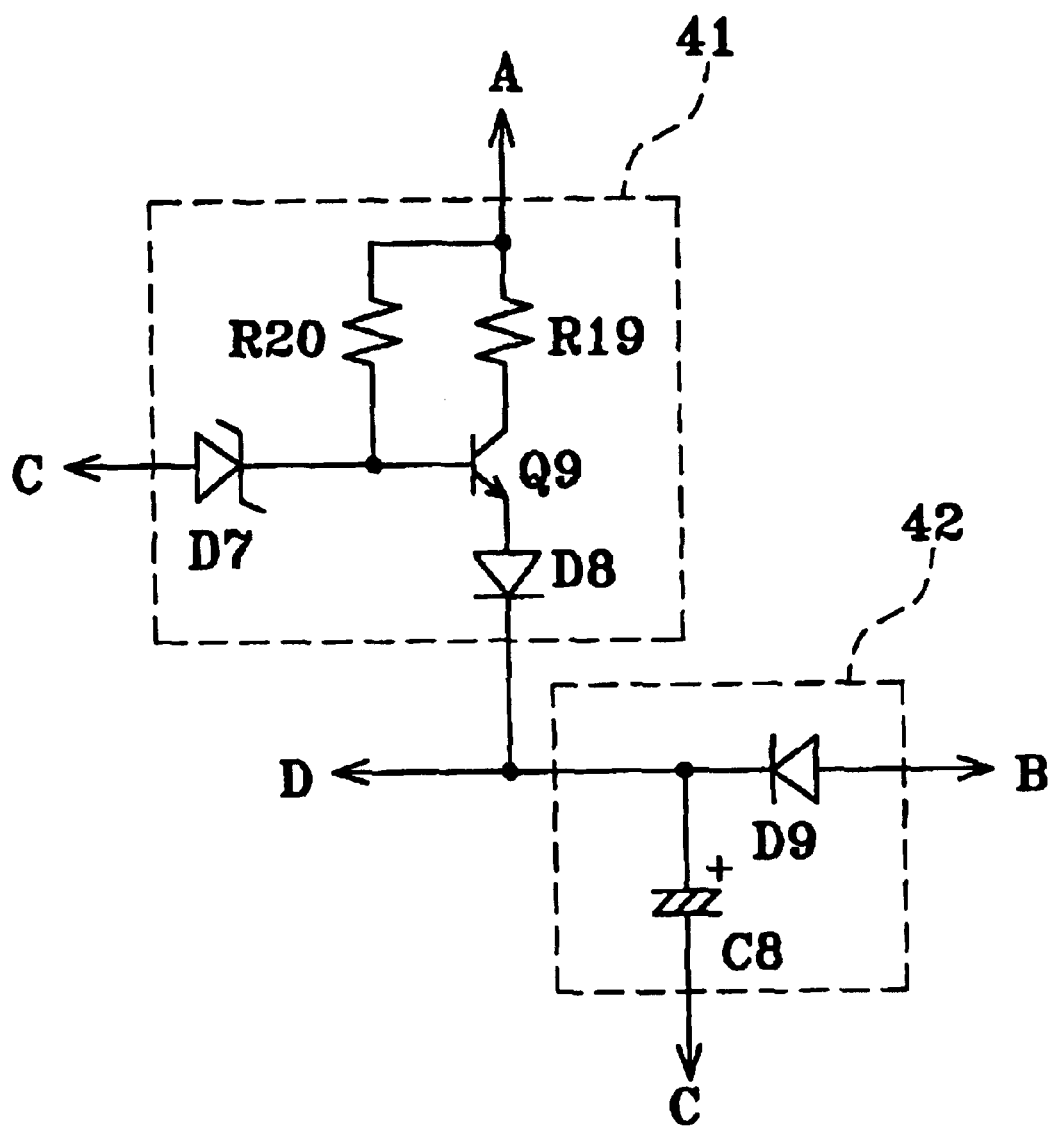
FIG. 9 is a circuit diagram showing the remaining portion of the switching power supply unit the major portion of which is shown in FIG. 8.

FIGS. 8 and 9 are circuit diagrams of a switching power supply unit 40 according to a fifth preferred embodiment of the present invention. FIG. 9 shows a portion of the switching power supply unit 40 that cannot be shown in FIG. 8. In FIG. 8, the same or similar elements as in FIG. 7 are referred to with the same reference numerals and the descriptions of those elements will not be repeated.

Referring to FIGS. 8 and 9, the switching power supply unit 40 includes a constant voltage regulator 41 and a DC voltage source 42 in addition to the arrangement of the switching power supply unit 30 shown in FIG. 7. Referring to FIG. 8, point A represents one end of the DC power supply Vcc (one end of the primary winding N1), point B represents one end of the feedback winding N3, point C represents the other end of the DC power supply Vcc (the other end of the feedback winding N3 and the ground at the input side), and point D represents a node between the resistors R11, R16, and R17. Although, in the switching power supply unit 30 shown in FIG. 7, a point corresponding to the point D is connected to a point corresponding to the point A, the point D is not connected to the point A in the switching power supply unit 40.

The constant voltage regulator 41 includes a resistor R19, a resistor R20, a transistor Q9, a Zener diode D7, and a diode D8. The collector of the transistor Q9 is connected to the point A through the resistor R19, the base of the transistor Q9 is connected to the point C through the Zener diode D7, and the emitter of the transistor Q9 is connected to the point D through the diode D8. The base of the transistor Q9 is also connected to the point A through the resistor R20. With this arrangement, the base voltage of the transistor Q9 is kept constant to the Zener voltage of the Zener diode D7. As a result of this, the emitter of the transistor Q9 is kept constant to a value that is approximately 0.6 V lower than the base voltage thereof.

The DC voltage source 42 is a rectification circuit defined by the diode D9 and the capacitor C8. The cathode voltage of the diode D9 is a voltage obtained by rectifying the voltage generated in the feedback winding N3.

The emitter of the transistor Q9 in the constant voltage regulator 41 is connected to the point D and the cathode of the diode D9 in the DC voltage source 42 through the diode D8.

In the switching power supply unit 40, when the power supply is turned on, since voltage is not generated in the feedback winding N3, the DC voltage source 42 does not operate. Thus, a voltage that is kept constant by the constant voltage regulator 41 is supplied to the point D via the diode D8. When the voltage generated in the feedback winding N3 causes the operation of the DC voltage source 42 to be started, the cathode voltage of the diode D9 becomes higher than the emitter voltage of the transistor Q9. Thus, the output voltage of the DC voltage source 42 is supplied to the point D. The current supplied from the constant voltage regulator 41 to the point D is blocked. In other words, the diode D8 functions to prevent backflow from the DC voltage source 42 to the constant voltage regulator 41.

In the switching power supply unit 40 with the arrangement described above, when the power supply is turned on, a voltage kept constant by the constant voltage regulator 41 is applied to the resistor R16, which functions as a starting resistor. When the power supply is not turned on, a voltage lower than the DC power supply Vcc is applied from the DC voltage source 42 to the resistor R16. Thus, power consumption can be reduced as compared with a case where voltage is directly applied from the DC power supply Vcc.

Since the switching power supply unit 40 is identical to the switching power supply unit 30 with the exception of the starting circuit portion, the switching power supply unit 40 operates as a switching power supply in a heavy-load mode and a light-load mode, as in the switching power supply unit 30.

Such an arrangement in which a constant voltage regulator and a DC voltage source are used is applicable to any of the preferred embodiments described above. In such a case, operational effects as in the switching power supply unit 40 can be achieved.

Sixth Preferred Embodiment

Figure 10:
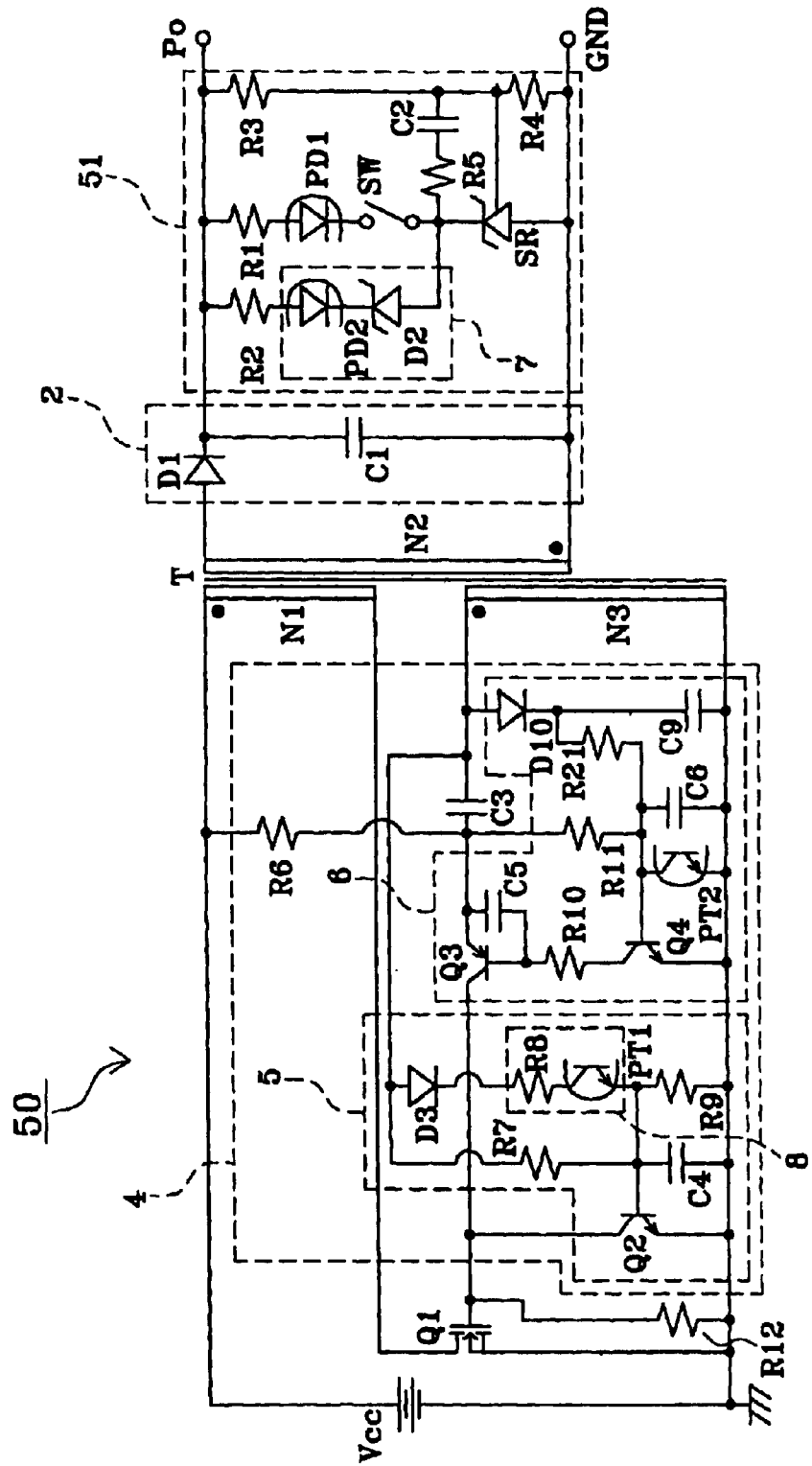
FIG. 10 is a circuit diagram of a switching power supply unit according to a sixth preferred embodiment of the present invention.

FIG. 10 is a circuit diagram of a switching power supply unit 50 according to a sixth preferred embodiment of the present invention. In FIG. 10, the same or similar elements as in FIG. 1 are referred to with the same reference numerals and the descriptions of those elements will not be repeated.

The switching power supply unit 50 shown in FIG. 10 is different from the switching power supply unit 1 shown in FIG. 1 only in that an output voltage detection circuit 51 is provided in place of the output voltage detection circuit 3. In the output voltage detection circuit 51, a switch SW is provided in series with the first light-emitting diode PD1. Although, in the switching power supply unit 1, the resistance of the resistor R8 constituting the second series circuit 8 in the on-period control circuit 5 is preset to be higher than a case where an off-period circuit is not provided, the resistance of the resistor R8 in the switching power supply unit 50 is set to be a normal level that is similar to the case where the off-period circuit is not provided.

In the switching power supply unit 50 with such an arrangement, the switch SW is turned on in the heavy-load mode. In this case, no current flows into the second light-emitting diode PD2, as in the switching power supply unit 1 shown in FIG. 1 in the heavy-load mode. Thus, the off-period control circuit 6 does not operate, and the on-period control is performed.

In the light-load mode, the switch SW is turned off by a standby signal (a signal indicating that an apparatus is in a standby mode) transmitted from an apparatus such as a facsimile machine in which the switching power supply unit 50 is incorporated. In this case, since no current flows into the first light-emitting diode PD1, the first feedback signal is not output. Thus, current inevitably flows into the second light-emitting diode PD2, and the second feedback signal is output. Therefore, the off-period control circuit 6 operates and the off-period control is performed.

As described above, in the switching power supply unit 50, switching between the on-period control and the off-period control is forcibly taken place by switching on and off of the switch SW. Switching between the on-period control and the off-period control does not take place automatically. The operation of the switching power supply unit 50 in each of the control states is substantially the same as that of the switching power supply unit 1 shown in FIG. 1, thus achieving similar operational effects.

Although, in the switching power supply unit 50, the switch SW is provided in the output voltage detection circuit 51 corresponding to the output voltage detection circuit 3 in the switching power supply unit 1 shown in FIG. 1, it is obvious that the switching power supply unit according to any of the preferred embodiments described above can be arranged in a similar manner.

Seventh Preferred Embodiment

Figure 11:
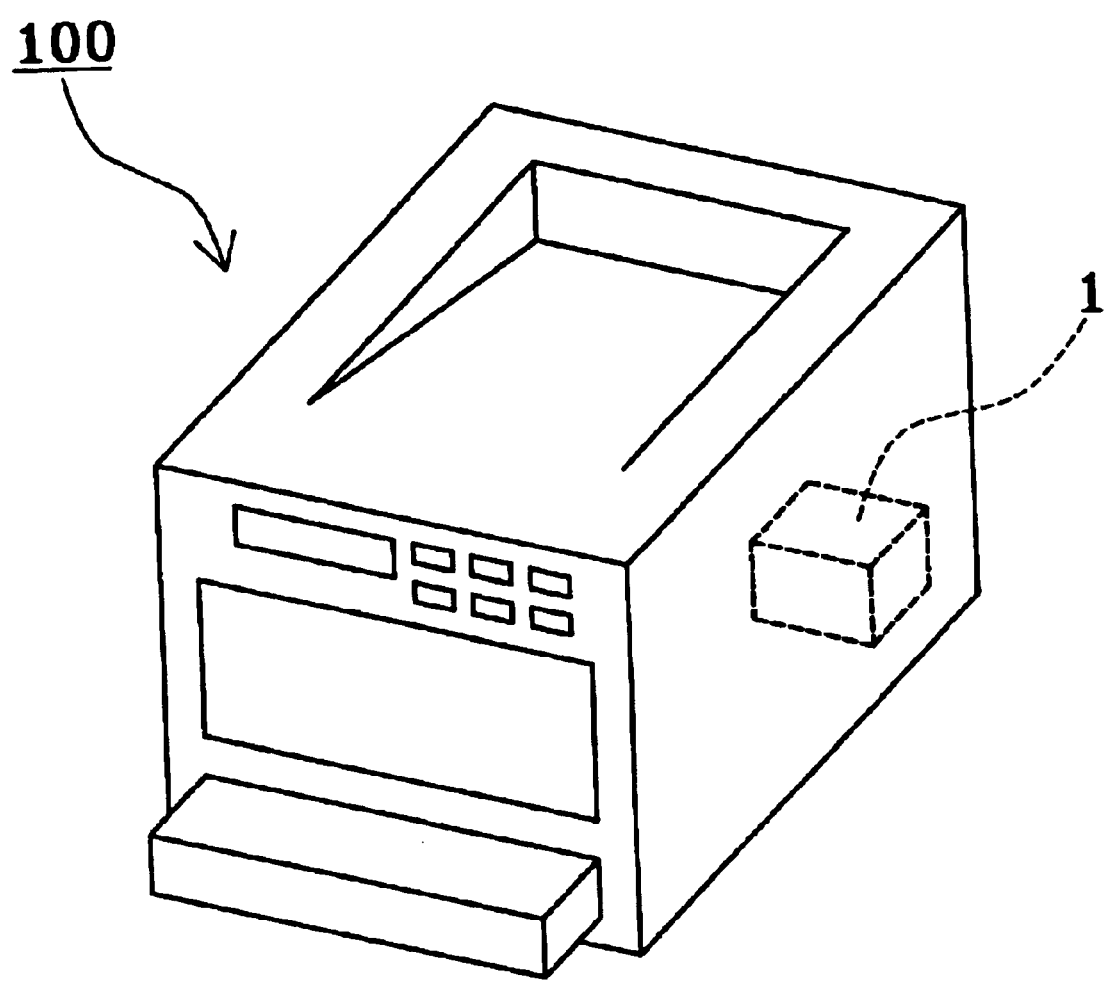
FIG. 11 is a perspective view of an electronic apparatus according to a seventh preferred embodiment of the present invention.

FIG. 11 is a perspective view of an electronic apparatus according to a seventh preferred embodiment of the present invention. Referring to FIG. 11, the switching power supply unit 1 according to preferred embodiments of the present invention is used as a portion of a power supply circuit of a printer 100, which is an electronic apparatus.

In a portion of the printer 100 that relates to a printing operation, although power is consumed in the printing operation, hardly any power is consumed in a standby mode in which the printing operation is not performed. The use of the switching power supply unit 1 according to preferred embodiments of the present invention reduces the power loss in the standby mode and thus achieves an improvement in the efficiency.

Although the switching power supply unit 1 shown in FIG. 1 is used in the printer 100 shown in FIG. 11, the switching power supply unit 10, 20, 30, 40, or 50 shown in FIGS. 5, 6, 7, 8, 9, or 10 may be used. In such a case, similar operational effects can be achieved.

The electronic apparatus according to preferred embodiments of the present invention is not limited to a printer. Various electronic apparatuses, such as a notebook computer and a portable information device, which require a DC power supply with stable voltage, are also included.

The present invention is not limited to each of the above-described preferred embodiments, and various modifications are possible within the range described in the claims. An embodiment obtained by appropriately combining technical means disclosed in each of the different preferred embodiments is included in the technical scope of the present invention.

What is claimed is:

1. A switching power supply unit comprising:
 a transformer including a primary winding, a secondary winding, and a feedback winding;
 an input power supply;
 a first switching element;
 a control circuit provided between one end of the feedback winding and a control terminal of the first switching element;
 a rectification circuit connected to the secondary winding; and
 an output voltage detection circuit for detecting output voltage output from the rectification circuit and for sending a feedback signal to the control circuit; wherein
 the input power supply and the first switching element are connected in series with the primary winding, and the control circuit includes an on-period control circuit for stabilizing the output voltage by turning off the first switching element in an on-state in accordance with the feedback signal and an off-period control circuit for stabilizing the output voltage by delaying turning on of the first switching element in accordance with the feedback signal.

2. A switching power supply unit according to claim 1, wherein, in a light-load mode, the output voltage is stabilized by operating the off-period control circuit in order to control the off-period, and in a mode other than the light-load mode, the output voltage is stabilized by operating the on-period control circuit in order to control the on-period.

3. A switching power supply unit according to claim 2, wherein the feedback signal includes a first feedback signal for controlling the on-period control circuit and a second feedback signal for controlling the off-period control circuit, and the output voltage detection circuit exclusively outputs the first feedback signal or the second feedback signal in accordance with load power.

4. A switching power supply unit according to claim 3, wherein the output voltage detection circuit includes a first light-emitting diode for outputting the first feedback signal, a shunt regulator connected in series with the first light-emitting diode, and a first series circuit connected in parallel with the first light-emitting diode;
 the first series circuit includes a second light-emitting diode and a constant voltage source that is arranged in such a manner that no current flows into the second light-emitting diode until the output voltage exceeds a predetermined value;

the on-period control circuit includes a second switching element provided between the control terminal of the first switching element and a ground at an input side and a time constant circuit connected to a control terminal of the second switching element and functioning to turn on the second switching element;

the time constant circuit includes a second series circuit including a resistor and a first phototransistor that is coupled to the first light-emitting diode; and the resistance value of the resistor in the second series circuit is such that current flowing into the first phototransistor is hardly changed even when a current greater than or equal to a predetermined value flows into the first light-emitting diode, thereby the time constant of the time constant circuit does not change and the on-period control circuit does not practically operate in order to stabilize the output voltage.

5. A switching power supply unit according to claim 3, wherein the output voltage detection circuit includes a first light-emitting diode for outputting the first feedback signal, a switch connected in series with the first light-emitting diode, a shunt regulator connected in series with a series circuit including the first light-emitting diode and the switch, and a first series circuit connected in parallel with the series circuit including the first light-emitting diode and the switch;

the first series circuit includes a second light-emitting diode and a constant voltage source that is arranged such that no current flows into the second light-emitting diode until the output voltage exceeds a predetermined value;

the on-period control circuit includes a second switching element provided between the control terminal of the first switching element and a ground at an input side and a time constant circuit connected to a control terminal of the second switching element and functioning to turn on the second switching element; and the time constant circuit includes a second series circuit including a resistor and a first phototransistor that is coupled to the first light-emitting diode.

6. A switching power supply unit according to claim 4, wherein the off-period control circuit includes a third switching element connected in series between the one end of the feedback winding and the control terminal of the first switching element, and the third switching element is switched in accordance with the second feedback signal sent from the output voltage detection circuit.

7. A switching power supply unit according to claim 6, wherein the off-period control circuit includes a second phototransistor coupled to the second light-emitting diode, and the third switching element is switched when the resistance of the second phototransistor is a predetermined value or less.

8. A switching power supply unit according to claim 7, wherein the second phototransistor functions as part of the time constant circuit in the on-period control circuit by connecting the emitter of the second phototransistor to the control terminal of the second switching element.

9. A switching power supply unit according to claim 6, wherein the off-period control circuit includes a third series circuit including a capacitor and a second phototransistor that is coupled to the second light-emitting diode, the third series circuit is connected in parallel with the feedback winding in a direction of the current flowing during the off-period of the first switching element, and the third switching element is turned off when the charging voltage of the capacitor due to a voltage generated in the feedback winding is a predetermined value or more.

10. A switching power supply unit according to claim 7, wherein the off-period control circuit includes a limit circuit for limiting voltage applied to the control terminal of the first switching element, and the limit circuit includes the third switching element.

11. A switching power supply unit according to claim 1, further comprising:

a DC voltage source for supplying a driving voltage to the off-period control circuit by utilizing voltage generated in the feedback winding; and a constant voltage regulator provided between the input power supply and the output of the DC voltage source and having a function to prevent backward current.

12. An electronic apparatus comprising the switching power supply unit as set forth in claim 1.

* * * * *